United States Patent
Iaroshevych

(10) Patent No.: US 10,873,602 B2
(45) Date of Patent: Dec. 22, 2020

(54) SECONDARY COMMUNICATION CHANNEL FOR SECURITY NOTIFICATIONS

(71) Applicant: Facebook, Inc., Menlo Park, CA (US)

(72) Inventor: Oleg Iaroshevych, London (GB)

(73) Assignee: Facebook, Inc., Menlo Park, CA (US)

( * ) Notice: Subject to any disclaimer, the term of this patent is extended or adjusted under 35 U.S.C. 154(b) by 270 days.

(21) Appl. No.: 15/714,968

(22) Filed: Sep. 25, 2017

(65) Prior Publication Data
US 2019/0098053 A1 Mar. 28, 2019

(51) Int. Cl.
| | |
|---|---|
| *H04L 29/06* | (2006.01) |
| *G06F 21/55* | (2013.01) |
| *G06F 21/45* | (2013.01) |
| *G06F 3/0484* | (2013.01) |
| *G06F 3/0488* | (2013.01) |

(52) U.S. Cl.
CPC .............. *H04L 63/18* (2013.01); *G06F 21/45* (2013.01); *G06F 21/554* (2013.01); *H04L 63/08* (2013.01); *H04L 63/10* (2013.01); *G06F 3/0484* (2013.01); *G06F 3/0488* (2013.01); *H04L 2463/144* (2013.01)

(58) Field of Classification Search
CPC .............. H04L 63/18; H04L 2463/082; H04L 63/0853; H04L 9/3234; H04L 9/0863; H04L 9/3228; H04L 63/0838; H04L 63/08; H04L 63/10; H04L 2463/144; G06F 21/34; G06F 21/45; G06F 21/554; G06F 3/0488; G06F 21/42–43; G06F 3/0484

See application file for complete search history.

(56) References Cited

U.S. PATENT DOCUMENTS

| | | | | |
|---|---|---|---|---|
| 8,224,727 | B2* | 7/2012 | Hirson | H04L 12/1881 705/35 |
| 8,812,600 | B1* | 8/2014 | McGuirk | H04L 51/046 705/14.12 |
| 9,801,066 | B1* | 10/2017 | Hanley | G06Q 20/405 |
| 2011/0179126 | A1* | 7/2011 | Wetherell | H04L 51/36 709/206 |
| 2013/0104203 | A1* | 4/2013 | Davis | H04L 63/0861 726/5 |
| 2013/0167207 | A1* | 6/2013 | Davis | G06F 21/316 726/5 |
| 2013/0191481 | A1* | 7/2013 | Prevost | H04L 12/1859 709/206 |
| 2014/0096205 | A1* | 4/2014 | Zhuang | G06F 21/41 726/4 |
| 2014/0207877 | A1* | 7/2014 | Kandaswamy | H04L 51/32 709/206 |

(Continued)

*Primary Examiner* — Techane Gergiso
(74) *Attorney, Agent, or Firm* — FisherBroyles, LLP

(57) ABSTRACT

Exemplary methods, apparatuses, and systems include a communication system accessing a request received from an application on a user device to log into a primary platform of a communication system using a user account. In response to detecting the request as an unrecognized login attempt, that the user account also grants access to a secondary platform of the communication system, and that settings of the user account include enabled push notifications via the secondary platform, the communication system provides a notification for display to a user of the user account via the secondary platform.

20 Claims, 9 Drawing Sheets

(56) References Cited

U.S. PATENT DOCUMENTS

| | | | | |
|---|---|---|---|---|
| 2014/0331278 A1* | 11/2014 | Tkachev | ............... | H04L 63/08 |
| | | | | 726/1 |
| 2015/0113172 A1* | 4/2015 | Johnson | ............... | G06Q 10/10 |
| | | | | 709/245 |
| 2015/0186945 A1* | 7/2015 | Samuel | ............. | G06Q 30/0267 |
| | | | | 705/14.25 |
| 2016/0050227 A1* | 2/2016 | Desai | .................. | H04L 63/104 |
| | | | | 726/3 |
| 2016/0255505 A1* | 9/2016 | Oberheide | ............ | G06Q 20/32 |
| | | | | 726/7 |
| 2017/0034313 A1* | 2/2017 | Olivier | ................. | G06Q 50/01 |
| 2017/0041296 A1* | 2/2017 | Ford | ................... | H04W 12/06 |
| 2017/0214679 A1* | 7/2017 | Lin | ....................... | H04W 4/14 |
| 2018/0332032 A1* | 11/2018 | Arora | ............... | H04L 63/0853 |
| 2018/0359233 A1* | 12/2018 | Alexander | ............. | H04L 63/08 |

\* cited by examiner

SECONDARY COMMUNICATION CHANNEL FOR SECURITY NOTIFICATIONS

FIELD

The various embodiments described herein relate to detecting and notifying a user of a login request for the user's account from an unrecognized device. In particular, embodiments increase the likelihood and speed of user response to login notifications via the utilization of a push notification enabled secondary platform that is also accessible via the user account.

BACKGROUND

Login approval and notification tools improve user account security. For example, a login notification may inform a user via text message, email, or mobile application that an unrecognized device logged in using the account username and password. The notification may further provide one or more actions to take in response. For example, the notification may prompt the user to log into their account, approve or disapprove of the login, change settings, etc. User interaction with existing notifications, however, occurs at a lower percentage than desired as the interaction may require separately logging into the account to review and act upon the notification. Additionally, a user may ignore or overlook the notification if the notification is delivered among other less important notifications.

SUMMARY OF THE DESCRIPTION

Exemplary methods, systems, and apparatuses include a communication system accessing a request received from an application on a user device to log into a primary platform of a communication system using a user account. The communication system detects that the request as an unrecognized login attempt. For example, the login request may be from a device not included in a data structure storing trusted devices for the user account. The communication system determines that the user account also grants access to a secondary platform of the communication system. For example, the primary platform may be a social networking platform while the secondary platform is a messaging platform with less features than the primary, social networking platform. In response to detecting the request as an unrecognized login attempt, that the user account also grants access to a secondary platform of the communication system, and that settings of the user account include enabled push notifications via the secondary platform, the communication system provides a notification for display to a user of the user account via the secondary platform. The notification enables the user to respond by approving the account access, make security changes to the account, etc. within the secondary platform and utilizing the common user account between primary and secondary platforms.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include a communication system accessing a request received from an application on a user device to log into a primary platform of a communication system using a user account. In response to detecting the request as an unrecognized login attempt, that the user account also grants access to a secondary platform of the communication system, and that settings of the user account include enabled push notifications via the secondary platform, the communication system provides a notification for display to a user of the user account via the secondary platform. For example, a request from an unrecognized device to log into a user account on a social networking platform may trigger a push notification for verification to the user account via a messaging platform that is associated with, but has less features than, the social networking platform. Users are more likely to enable push notifications for the messaging platform. Additionally, the secondary platform is able to provide secure access to the user account. As a result, notifications are provided via a communication channel with a higher likelihood of user interaction and with integrated actions for securely responding to the notification.

The following description sets forth numerous specific details. One may practice embodiments without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Additionally, as used herein, the term "exemplary" refers to embodiments that serve simply as an example or illustration. Furthermore, it is within the knowledge of one skilled in the art to implement a feature, structure, or characteristic described in connection with one embodiment in connection with other embodiments, whether or not explicitly described.

Figure 1:
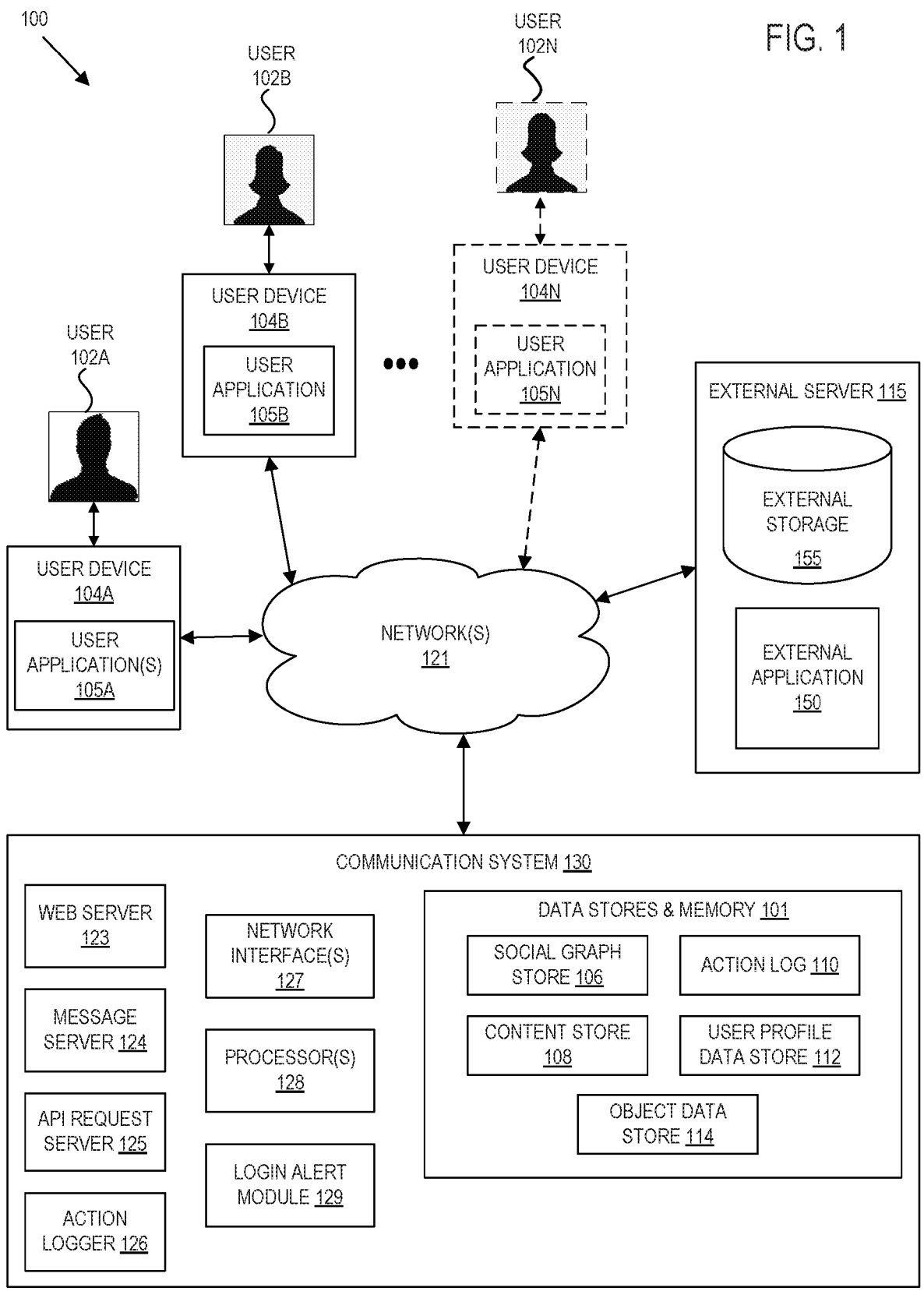
FIG. 1 illustrates an exemplary network environment including a communication system to detect and notify a user of a login or login attempt for the user's account from an unrecognized device.

FIG. 1 illustrates exemplary network environment of system 100, including a social networking or other communication system 130, to detect and notify a user of a login or login attempt for the user's account from an unrecognized device 104. User devices 104A-104N interact with communication system 130 and can be any type of computing device capable of receiving user input as well as transmitting and/or receiving data via a network (e.g., network(s) 121). Exemplary user devices 104A-104N include conventional computer systems, such as a desktop or laptop computer, or may include devices having computer functionalities such as Personal Digital Assistants (PDA), cellular or mobile telephones, smartphones, in- or out-of-car navigation systems, gaming devices, or other electronic devices.

In one embodiment, a user device (e.g. 104A) may execute one or more user applications 105A allowing user 102A of user device 104A to interact with the communication system 130. For example, user application 105A may be a web browser application. In one embodiment, user application 105A is a special-purpose client application (e.g., Facebook for iOS®, Facebook Messenger for iOS®, etc.) or the native operating system of the user device 104A, such as Windows®, Mac OSX®, iOS®, or ANDROID™, which may utilize an Application Programming Interface (API) to directly interface with communication system 130 through API request server 125.

User devices 104A-104N communicate with communication system 130 via network(s) 121, such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. Network 121 may be a wired network, wireless network, or a combination of both. In one embodiment, network 121 uses standard communications technologies and/or protocols.

In some embodiments, communication system 130 comprises one or more computing devices storing user profiles associated with users 102A-102N and/or other objects, as well as connections between users and other users 102A-102N and/or objects (e.g., as described with reference to FIG. 2). Users 102A-102N, using communication system 130, may add connections to other users or objects of the communication system 130 to which they desire to be connected, and may also interact with these other users or objects. The users of communication system 130 are individuals (e.g. humans), and the objects may include entities (such as businesses, organizations, universities, manufacturers, brands, etc.), concepts, or other non-human things including but not limited to a location, an album, an article, a book, a movie, food, etc.

Communication system 130 allows users 102A-102N to communicate or otherwise interact with each other and access content, as described herein. To provide these functionalities, one embodiment of communication system 130 includes web server 123, message server 124, API request server 125, action logger 126, and data stores and memory 101. This embodiment also includes, within data stores 101, social graph store 106, content store 108, action log 110, user profile data store 112, and object data store 114. Additionally, communication system 130 includes hardware components such as network interface(s) 127 and processor(s) 128. Communication system 130 may include additional components, such as security mechanisms, load balancers, failover servers, management and network operations consoles, and the like (not illustrated so as to not obscure the details of the system). One or more buses (also not illustrated) may connect the various components shown in FIG. 1.

Communication system 130 uses data stores and memory 101 for storing data, metadata, and programs for execution by the microprocessor(s) 128. Data stores and memory 101 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Data stores and memory 101 may be internal or distributed memory.

Within data stores and memory 101, social graph store 106 tracks relationships between users and objects within communication system 130. Based on the stored data about users, objects, and the connections between the users and/or objects, communication system 130 generates and maintains a "social graph" in social graph store 106 comprising a plurality of nodes interconnected by a plurality of edges. Each node in the social graph represents a user or object that can act on another node and/or that can be acted on by another node. An edge between two nodes in the social graph represents a connection between the two nodes, which may result from one of the nodes performing an action that on the other node. For example, when a user identifies an additional user as a friend, communication system 130 generates an edge in the social graph connecting a node representing the first user and another node representing the additional user. The generated edge has a connection type indicating that the users are friends. As various nodes interact with each other, communication system 130 adds, removes, or otherwise modifies edges connecting the various nodes to reflect the interactions. An exemplary social graph is described with reference to FIG. 2.

Content store 108 stores content items associated with user profiles, such as images, videos, and/or audio files. Communication system 130 may display content items from content store 108 when a user profile is viewed or when other content associated with the user profile is viewed. For example, displayed content items may show images or video associated with a user profile or show text describing a user's status (e.g., as a part of a primary platform of communication system 130). Additionally, other content items may facilitate user engagement by encouraging a user to expand his connections to other users or entities, to invite new users to the system or to increase interaction with communication system 130 by displaying content related to users, objects, activities, or functionalities of communication system 130. Examples of social networking content items include suggested connections or suggestions to perform other actions, media provided to or maintained by communication system 130 (e.g., pictures, videos, etc.), status messages or links posted by users to communication system 130, events, groups, pages (e.g., representing an organization or commercial entity), and any other content provided by, or accessible via, communication system 130.

Communication system 130 uses action log 110 to track user actions within communication system 130, as well as external actions transmitted to communication system 130. For example, communication system 130 may allow users to interact with external (e.g., third-party) applications 150 (e.g., websites), external storage 155, and/or external servers 115 (e.g., server end stations). Users may interact with various objects that are a part of communication system 130. Interactions with objects may include commenting on posts, sharing links, and checking-in to physical locations via a mobile device, accessing content items in a sequence or other interactions. Additional examples of interactions with objects on the communication system 130 included in the action log 110 include logging into communication system 130, commenting on a photo album, communications between users, becoming a fan of a musician or brand by "liking" a page of the respective entity, adding an event to a calendar, joining a group, creating an event, authorizing an application, using an application, and engaging in a transaction. In some embodiments, communication system 130 uses data from the action log 110 to infer interests or preferences of the user, augmenting the interests included in the user profile and allowing a more complete understanding of user preferences.

Communication system 130 stores user profiles in the user profile data store 112. A user profile includes declarative information about the user that the user shared, and may also include profile information inferred by communication system 130 based on the social graph. In one embodiment, a user profile includes multiple data fields, each data field describing one or more attributes of the corresponding user of the communication system 130. The user profile information stored in user profile data store 112 describes users 102A-102N of communication system 130, including biographic, demographic, and other types of descriptive information, such as work experience, educational history, gender, relationship status, hobbies, location, other preferences, and the like. The user profile may also store information provided by the user. For example, communication system 130 may also store images, videos, and location data provided by the user within the user profile.

Object data store 114 includes one or more pages associated with entities and other non-user objects included in social graph store 106. An entity represents a non-individual user of communication system 130, such as a band, business, vendor, organization, university, etc. A page includes content associated with an entity. For example, a page identifies content (from the object data store 114) associated with an entity or other object as well as information describing how to present the content to users viewing the page.

Web server 123 links communication system 130 via network interface(s) 127 and network 121 to one or more user devices 104A-104N by accepting requests from user devices 104A-104N and/or transmitting webpages or other content to user devices 104A-104N, such as image files, audio files, video files, Java applets, Flash, XML, JavaScript, Cascading Style Sheets (CSS), and so forth.

Message server 124 (e.g., a dedicated server end station, a dedicated software application, etc.) also communicates with the user devices 104A-104N via network interface(s) 127 and network 121. Message server 124 sends and/or receives instant messages, queued messages (e.g., email), text and SMS (Short Message Service) messages, or any other suitable messaging technique. For example, message server 124 may facilitate instant messaging for a standalone application (e.g., Facebook Messenger) as well as the exchange of messages within a primary communication system platform that includes additional functionality (e.g., the browser-based version of Facebook).

API request server 125 allows external systems (e.g., external application 150 of external server 115, and/or user applications 105A of user devices 104A-104N) to access information from or transmit information to communication system 130 by issuing API calls. The information provided by communication system 130 may include user profile information or the connection information of users, subject to the individual privacy settings of the user. For example, a system (e.g., external application 150) may send an API request to communication system 130 via network 121 to publish a story on behalf of a user, request information about a user (user permission settings permitting), upload a photograph on behalf of a user, etc. Communication system 130 receives API requests via API request server 125, which then processes the request by performing actions sought by the API requests, determining appropriate responses to the API requests, and transmitting back these responses back to the requesting application via network 121.

When a user takes an action within communication system 130, action logger 126, subject to any privacy settings and restrictions of the user and/or communication system 130, may record the action in action log 110. In one embodiment, communication system 130 maintains action log 110 as a database of entries. In accordance with various embodiments, action logger 126 can receive communications from web server 123 about user actions on and/or off the communication system 130. Action logger 126 populates action log 110 with information about those user actions. Examples of actions taken in the communication system 130 that may be stored in the action log 110 include, but are not limited to, adding a connection to another other user, sending a message to the other user, reading a message from the other user, viewing content (e.g., posts, images, videos) associated with or created by the other user, attending an event posted by another user, being tagged in posts or photos with/by another user, etc.

Communication system 130 includes network interface(s) 127, which may include a port, connector for a dock, or a connector for a USB interface, FireWire, Thunderbolt, Ethernet, Fibre Channel, etc. to connect communication system 130 with another device, external component, and/or network(s) 121. Exemplary network interface(s) 127 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol.

Communication system 130 also includes one or more microprocessors 128 and connected system components (e.g., multiple connected chips). For example, communication system 130 may implement one or more the modules described in this document by processor(s) 128 executing sequences of instructions contained in memory 101 or another non-transitory machine-readable storage medium.

In some embodiments, a message sent by a user to another user by way of communication system 130 can be viewed by other users of communication system 130, for example, by certain connections of the user (directly connected users in the social graph, other users more than one hop away in the social graph, etc.) receiving the message. An example of a type of message that other users of communication system 130 can view (besides the recipient of the message) is commonly known as a "post." In some embodiments, a user can send a private message to another user that only the other user can retrieve (e.g., via message server 124).

In the depicted embodiment, communication system 130 includes login alert module 129. Login alert module 129 detects and notifies a user of a login or login attempt for the user's account from an unrecognized device. For example, login alert module 129 enables the configuration of login alerts, detects logins from unrecognized devices, and enables user actions in response to login alerts as described with reference to FIGS. 3-9.

Figure 2:
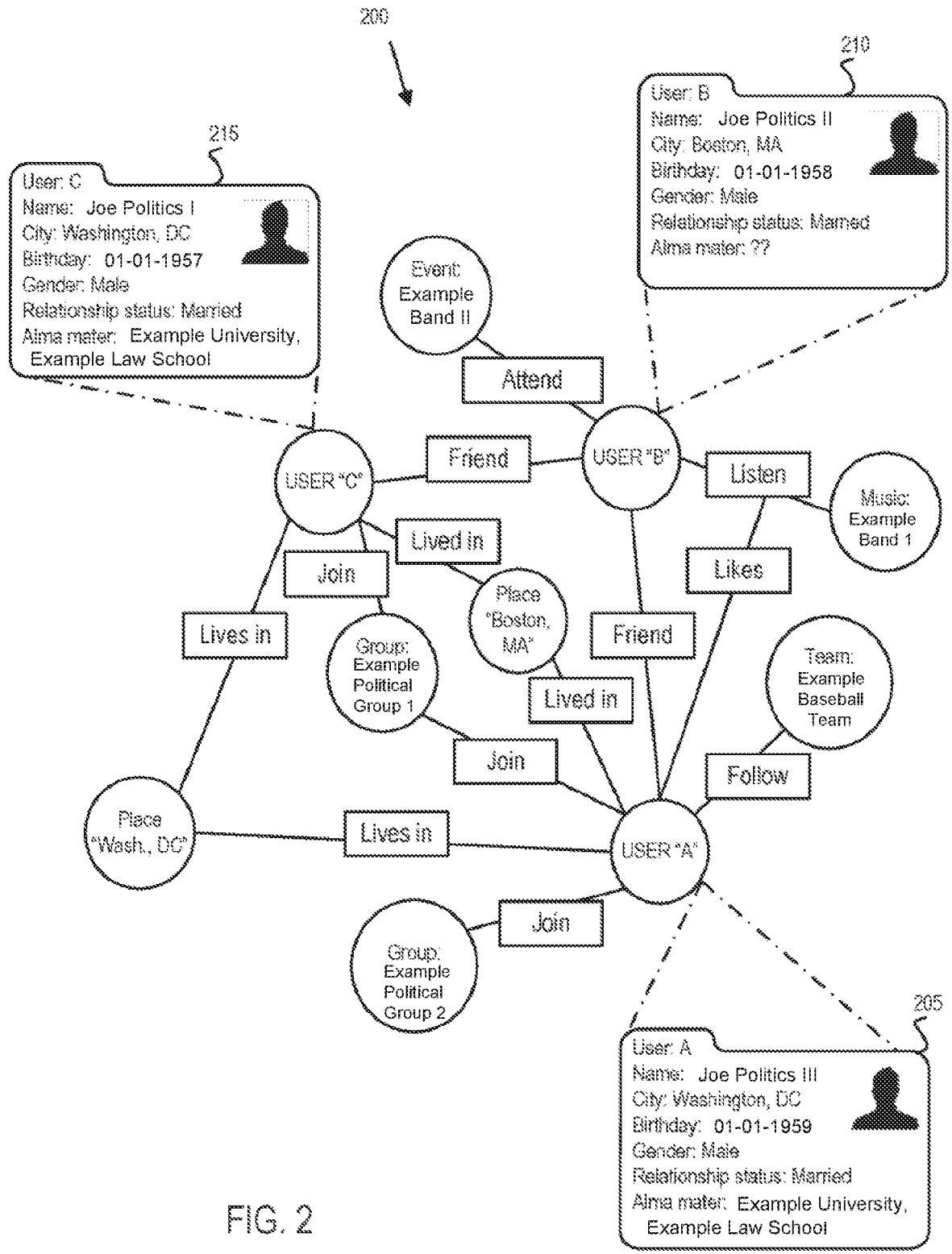
FIG. 2 illustrates an exemplary graph of communication system network data used by primary and secondary platforms accessed by the user account.

FIG. 2 illustrates exemplary graph 200 of communication system network data used by primary and secondary platforms accessed by the user account. Graph 200 illustrates objects as circles and actions as labeled connections between circles. Developers of communication system 130 or corresponding applications define actions to represent different ways that users may interact with communication system 130 and/or their applications. As users perform actions, communication system 130 makes connections between users and objects in graph 200. For example, User A has performed several actions within communication system 130, indicating that he previously lived in Boston, currently lives in Washington D.C., joined various political groups, and is friends with User B. User B and User C have also performed several actions with respect to objects within graph 200.

In one embodiment, users can add demographic information to user profiles 205-215. In one embodiment, for demographic information that a user has not entered, communication system 130 generates an estimate based upon the user's actions, connections, and/or actions of connections. For example, User B has not entered an alma mater into user profile 210. Communication system 130 may determine from User B's contacts, activities, cities of residence, etc. that User B's likely alma mater is one or both of a university and a law school. In one embodiment, the user profiles 205-210 include additional information, such as types of relationships to other users, places where the user has worked, user interests, etc. In one embodiment, the relationship types include connections between users that a secondary platform of communication system 130 uses to implement its features. For example, a secondary platform may facilitate messaging between users. The relationships in graph 200 may represent users that are able to exchange messages with one another via the secondary platform.

In one embodiment, users can provide feedback on actions of other users/entities. Thus, graph 200 represents actions as objects that users can act upon. For example, User B listened to music by an artist Communication system 130 publishes a narrative associated with User B's (e.g., in a newsfeed, profile of User B, etc.) indicating that User B listened to music by the artist. In viewing a newsfeed, profile of User B, or another form of system publication(s), communication system 130 displays the narrative to User A. Communication system 130 then receives input from User A indicating that User A "likes" that User B listened to the artist.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second-degree connection between User A and User C. An indication that two users are in a marital relationship may indicate a stronger affinity than if two users are friends. Additionally, temporal and geographic proximity of actions/users are other exemplary indicators of affinity.

Figure 3:
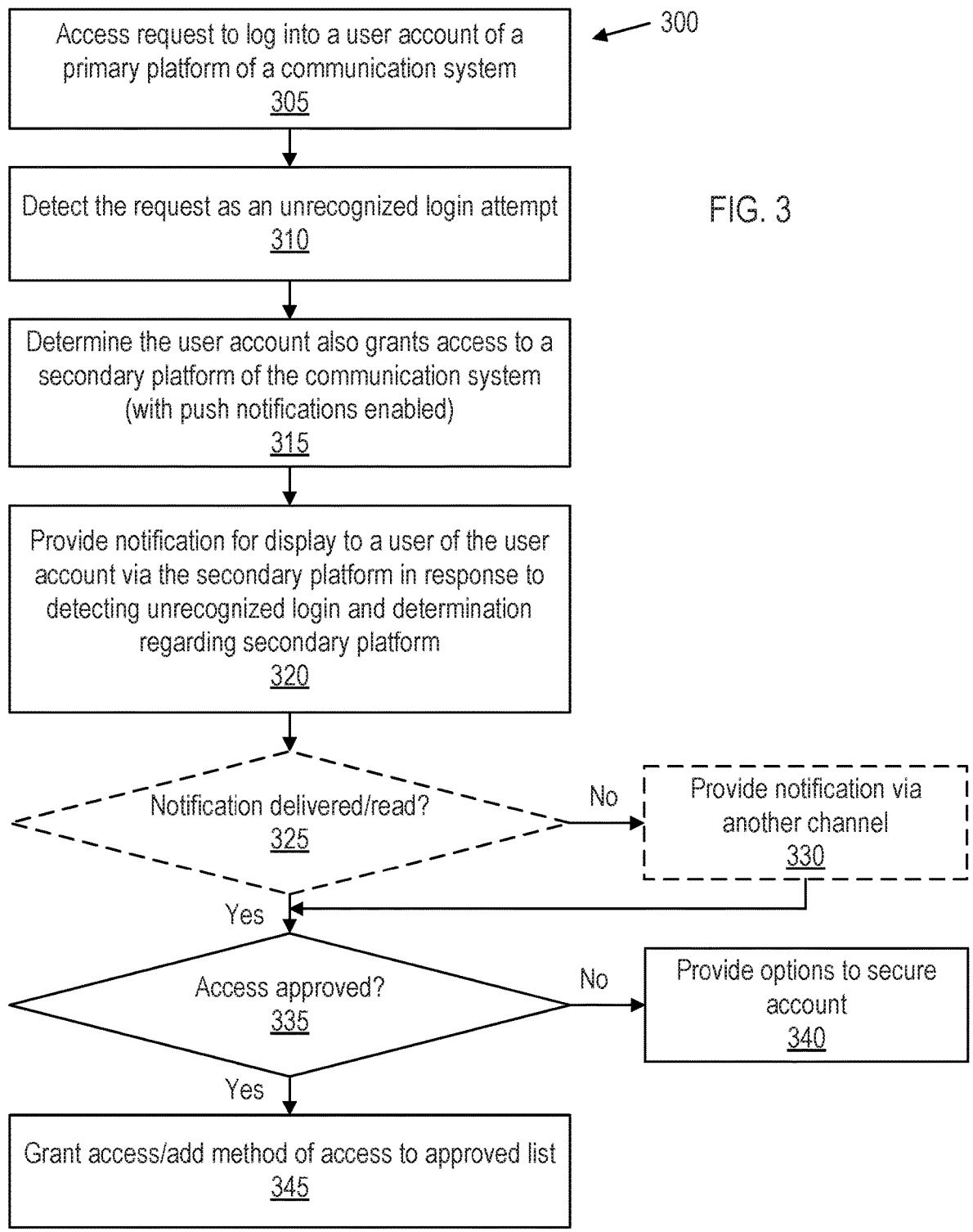
FIG. 3 is a flow chart illustrating an exemplary method to detect and notify a user of a login or login attempt for the user's account from an unrecognized device.

FIG. 3 is a flow chart illustrating exemplary method 300 to detect and notify a user of a login or login attempt for the user's account from an unrecognized device. At block 305, login alert module 129 accesses a request to log into a user account of a primary platform of communication system 130. For example, communication system 130 receives a username and password from a user device 104 requesting to log into a user account. In one embodiment, communication system 130 allows the login to proceed if the request included the correct username and password. In another embodiment, communication system 130 waits for login alert module 129 to determine whether the login method (e.g., device and/or software used to access the account) is a recognized login method. In such an embodiment, a recognized login method (e.g., trusted user device) results in communication system 130 allowing the login to proceed.

At block 310, login alert module 129 detects that the request is an unrecognized login or login attempt. For example, login alert module 129 may maintain a list or other data structure of trusted user devices (or combinations of trusted user device and software running on the trusted user devices) per user account. If the request originates from a device or combination of device and software that is not within the data structure, login alert module 129 detects the request as being unrecognized.

At block 315, login alert module 129 determines the user account also grants access to a secondary platform of communication system 130. For example, in response to detecting an unrecognized login or login attempt, login alert module 129 determines how to best notify the user for the account. The primary platform of communication system 130 may include some or all the features described with reference to FIGS. 1-2 while the secondary platform only includes a subset of those features. In one embodiment, the primary platform is a full-featured social networking system or similar communication system that enables users to post media, view user profiles and media collections, join groups, follow entities, maintain extensive profiles, organize and/or join in planned events, etc. while the secondary platform is a messaging platform between the users with limited features. Facebook and Facebook Messenger are examples of primary and secondary platforms of a communication system. A secondary platform with limited features may provide a communication channel that is more likely to get the attention of the user while providing a fast and secure way for the user to interact with a notification of an unrecognized login request. For example, an application for the primary platform may generate many notifications related to the various features included in the primary platform. A user may not prioritize reviewing and interacting with those notifications due to the volume and low level of importance of many such notifications. Additionally, the user may disable (or decline a request to activate) primary platform notifications in the operating system settings for user device 104. Settings such as this, within the client device's operating system, cannot be overridden by the primary platform application, e.g., to send an important security message. The secondary platform, by contrast, may only include notifications for a limited set of features. For example, if an application for the secondary platform only notifies the user of messages from other users, the user may be more likely to activate/allow and interact with notifications of the secondary platform than notifications of the primary platform.

In one embodiment, login alert module 129 determines if the user settings include enabled push notifications for the secondary platform. For example, in response to detecting an unrecognized login or login attempt, login alert module 129 may prioritize the secondary platform as a communication channel for unrecognized login notifications when an application for the secondary platform on the user's device (s) can notify the user via a push notification, such as a pop up message on a user interface of a mobile device (and possibly a sound/vibration) triggered by a backend server or application. Such a notification may trigger device 104 to display the message (or trigger a sound/vibration) even when the secondary platform application is not currently running (e.g., when the user device is idle, in a lock screen mode, or running another application). Enabled push notifications may further improve the likelihood of user review and interaction with a notification for the unrecognized login request.

At block 320, login alert module 129 provides a notification for display to a user of the user account via the secondary platform in response to detecting that the request is an unrecognized login or login attempt and that the user account also grants access to a secondary platform of communication system 130. For example, login alert module 129 may transmit a notification via message server 124 to user device 104, causing application 105 to display a banner or other pop up alert message in the foreground or on the lock screen of user device 104. Such a banner or pop up alert message may include an icon or other graphical representation of the notification is from the secondary platform and text or other content to provide a context for the notification, increasing the likelihood of user interaction. In one embodiment, login alert module 129 provides the notification further in response to determining that user settings include enabled push notifications for the secondary platform.

At block 325, login alert module 129 optionally determines if communication system 130 successfully delivered the notification and/or if communication system received a read receipt from the user for the notification. For example, the operating system of device 104 or application 105 may be configured to confirm one or both of the receipt of the notification and the user reading, dismissing, or otherwise interacting with a display of the notification. User device 104 transmits the delivery receipt and/or read receipt to communication system 130. For example, the operating system of user device 104 may transmit a delivery receipt to communication system 130 to confirm that the notification was displayed on device 104 (regardless if application 105 for the secondary application is not currently running). In one embodiment, login alert module 129 determines success of delivery or user reading or otherwise interacting with the notification if login alert module 129 receives such a receipt within a threshold period following login alert module 129 providing or attempting to provide the notification for display to the user.

In another embodiment, login alert module 129 determines a probability of delivery of the notification. If communication system 130 or user device 104 does not support delivery/read receipts, login alert module 129 may use factors like (1) if notifications are enabled and/or (2) user device 104 communicating with communication system 130 within a threshold period of the notification. For example, if the user has enabled push notifications on user device 104 and communicated with message server 124 within an hour of the notification, there is a high probability of a successful notification delivery. If user device 104 has not communicated with message server 124 within an hour of the notification, login alert module 129 determines there is a low probability of a successful notification delivery.

If communication system 130 was unable to deliver the notification and/or if communication system did not receive a read receipt from the user for the notification, at block 330, login alert module 129 provides a notification for display to the user via another communication channel. For example, user settings for the user account may include alternate communication channels for notifications, such as email, text/SMS, a notification to an application for the primary platform running on a trusted device, etc.

If communication system 130 successfully delivered the notification and/or if communication system received a read receipt from the user for the notification (or if method 300 omits block 325), at block 335, login alert module 129 determines if the user approved the unrecognized login in response to the notification. For example, the user may respond to the notification with an indication as whether the user was responsible for or otherwise approved of the unrecognized login request. User interaction with an unrecognized login notification is described with reference to FIGS. 6-8.

If communication system 130 receives user disapproval of the unrecognized login, at block 340, login alert module 129 provides the user with options to secure the user's account. For example, login alert module 129 may provide one or more prompts for display to the user to enable the user to prevent the login attempt, terminate the login/session, review activity for the user account following the unrecognized login, change the password for the user account, etc.

If communication system 130 receives user approval of the unrecognized login, at block 345, login alert module 129 grants the unrecognized device with access to the user account and/or adds the unrecognized device to a list of approved devices.

Figure 4:
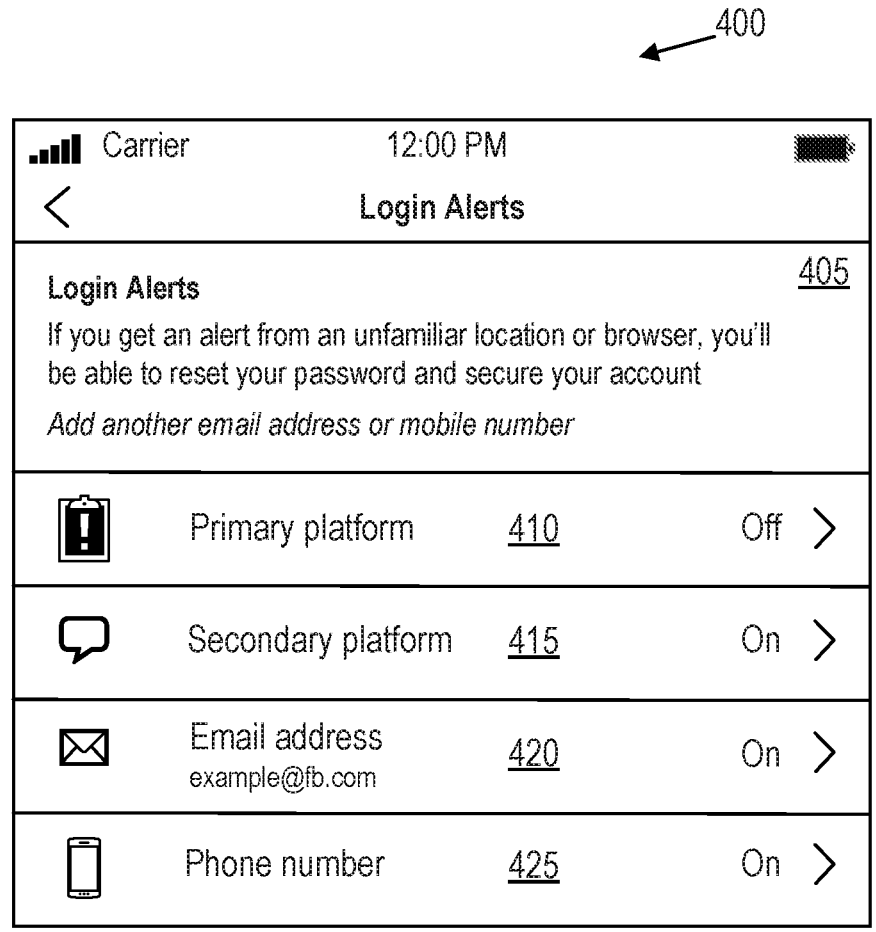
FIG. 4 is an exemplary user interface illustrating security options to enable login notifications.

FIG. 4 includes exemplary user interface (UI) 400 illustrating security options to enable login notifications. For example, communication system 130 may present UI 400 to a user in a security settings portion of the primary platform. UI 400 includes description 405 of login notifications and multiple communication channels 410-425 that a user may configure for login notifications. For example, a user may select to receive login notifications via one or more of: an application running the primary platform 410, an application running the secondary platform 415, via email 420, and/or via text or SMS 425.

Figure 5:
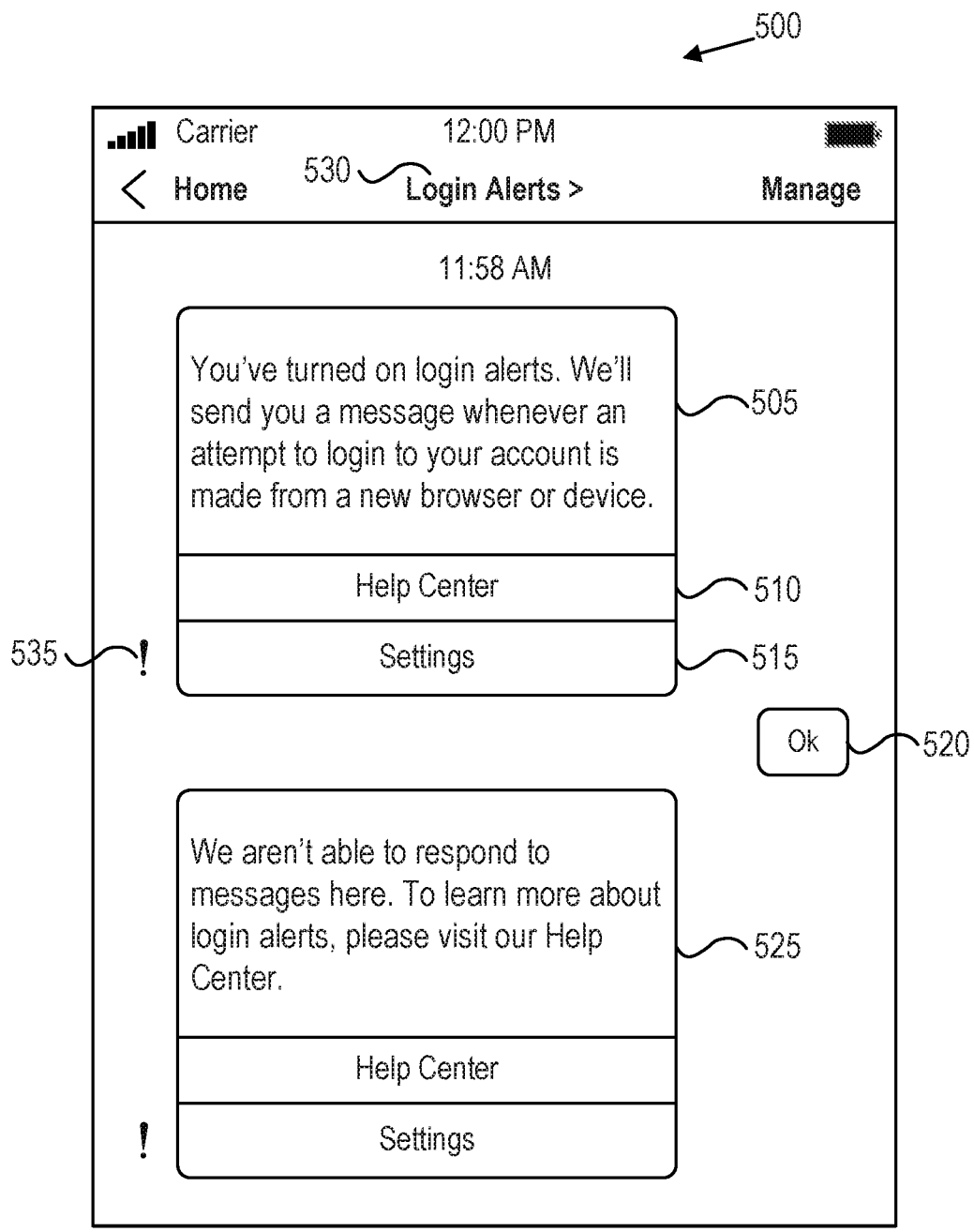
FIG. 5 is an exemplary user interface illustrating a message sent via a secondary platform to confirm the configuration of login notifications.

FIG. 5 includes exemplary user interface 500 illustrating message 505 sent via a secondary platform to confirm the configuration of login notifications. For example, user selection of secondary platform setting 415 in UI 400 may result in login alert module 129 transmitting confirmation message 505 to user device 104 via an application 105 running the secondary platform of communication system 130. In one embodiment, confirmation message 505 includes UI elements or pre-composed responses to interact with login alert module 129. For example, user interaction with UI element 510 may redirect the user (via a pop up window or by launching another application) to a "Help Center" to learn more about login notifications. User interaction with UI element 515 may redirect the user (via a pop up window or by launching another application) to further configure login notifications (e.g., as described with reference to FIGS. 4 and 9).

In one embodiment, the secondary platform is a messaging platform and login alert module 129 runs a chat bot application to notify and otherwise interact with users via the messaging platform. In such an embodiment, login alert module 129 may analyze and respond to text responses users send via the messaging interface. In another embodiment, login alert module 129 limits user interactions to pre-composed responses and user interactions with UI elements (e.g., UI elements 510 and 515). Message 520 is an example of a user message sent in response to confirmation message 505. Response message 525 is an example of login alert module 129 responding to user message 520 in an embodiment in which login alert module 129 limits user interactions to pre-composed responses and/or user interactions with UI elements.

In one embodiment, UI 500 includes indications of formality and importance. For example, the conversation or chat bot name 530 may carry the brand name of communication system 130, include an icon or other signal to confirm the identity/source of the message (e.g., a "verified" icon), and/or utilize a name indicating functionality rather than a typical name for a person. Additionally, messages may be emphasized by an icon 535, text color, or other visual representation to underscore their importance. For example, messages from login alert module 129 may use red text to highlight the urgency of such messages and to distinguish the messages from other conversations/chat threads.

Figure 6:
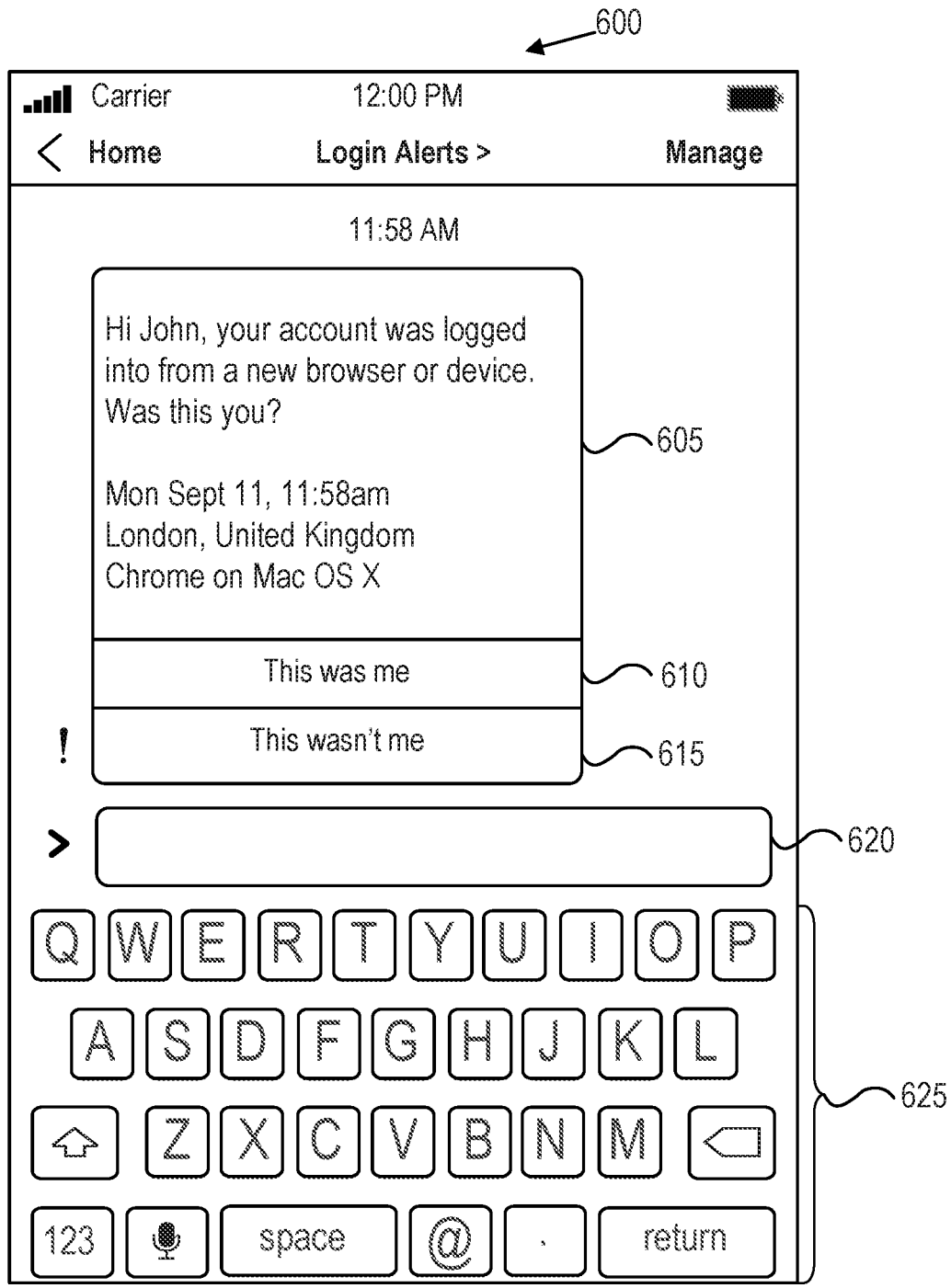
FIG. 6 is an exemplary user interface illustrating a login notification transmitted via the secondary platform and pre-composed responses to trigger an action by the security chat bot.

FIG. 6 includes exemplary user interface 600 illustrating login notification 605 transmitted via the secondary platform and pre-composed responses to trigger an action by a security chat bot run by login alert module 129. The text of notification 605 may vary based upon the context of the login request that triggered notification 605. For example, if communication system 130 is unable to determine a location associated with the login request, login alert module 129 omits the location (London, England in the illustrated example). Login alert module 129 may access the user's profile to personalize notification 605 with the user's name. In one embodiment, notification 605 includes graphical content. For example, notification 605 may include an image representing the type of device from which communication system 130 received the login request or a map representing the location of origin of the login request.

Pre-composed response 610 indicates that the login request was from (or authorized by) the user and pre-composed response 615 indicates that the login request was not from (or authorized by) the user. User interaction with a pre-composed response (e.g., "clicking" on a response) transmits a message to login alert module 129 according to the pre-composed response. If the user clicks or otherwise interacts with pre-composed response 615, login alert module 129 may take a default action (e.g., terminate the unrecognized session) and/or provide the user with options to secure the user's account. For example, login alert module 129 may provide one or more prompts for display to the user to enable the user to prevent the login attempt, terminate the login/session, review activity for the user account following the unrecognized login, change the password for the user account, etc. In one embodiment, these additional security prompts are provided as a message (e.g., similar to notification 605) and may include additional pre-composed responses of security options. Alternatively, login alert module 129 redirects the user (e.g., via a pop up window within the secondary platform to access the primary platform) to provide the user with the security options.

In one embodiment, UI 600 enables the user to respond via user-composed text. For example, the user may enter text via input field 620 using keyboard 625. Login alert module 129 analyzes the text users send via the messaging interface and determines whether the user is indicating that the login request was from (or authorized by) the user, that the login request was not from (or authorized by) the user, or that the user is electing to use a security option following an indication that the login request was not from (or authorized by) the user. In one embodiment, the chat bot functionality of login alert module 129 uses the determined direction provided in the user text to execute the direction within the primary platform. For example, login alert module 129 may interpret a user text response to block the unrecognized login as instruction to submit a request or call to another component of communication system 130 to block or terminate the session for the unrecognized login. As a result, the user can interact with a chat bot/virtual assistant within the secondary platform and the chat bot/virtual assistant will take the appropriate actions on behalf of the user to secure the user account within the primary platform.

Figure 7:
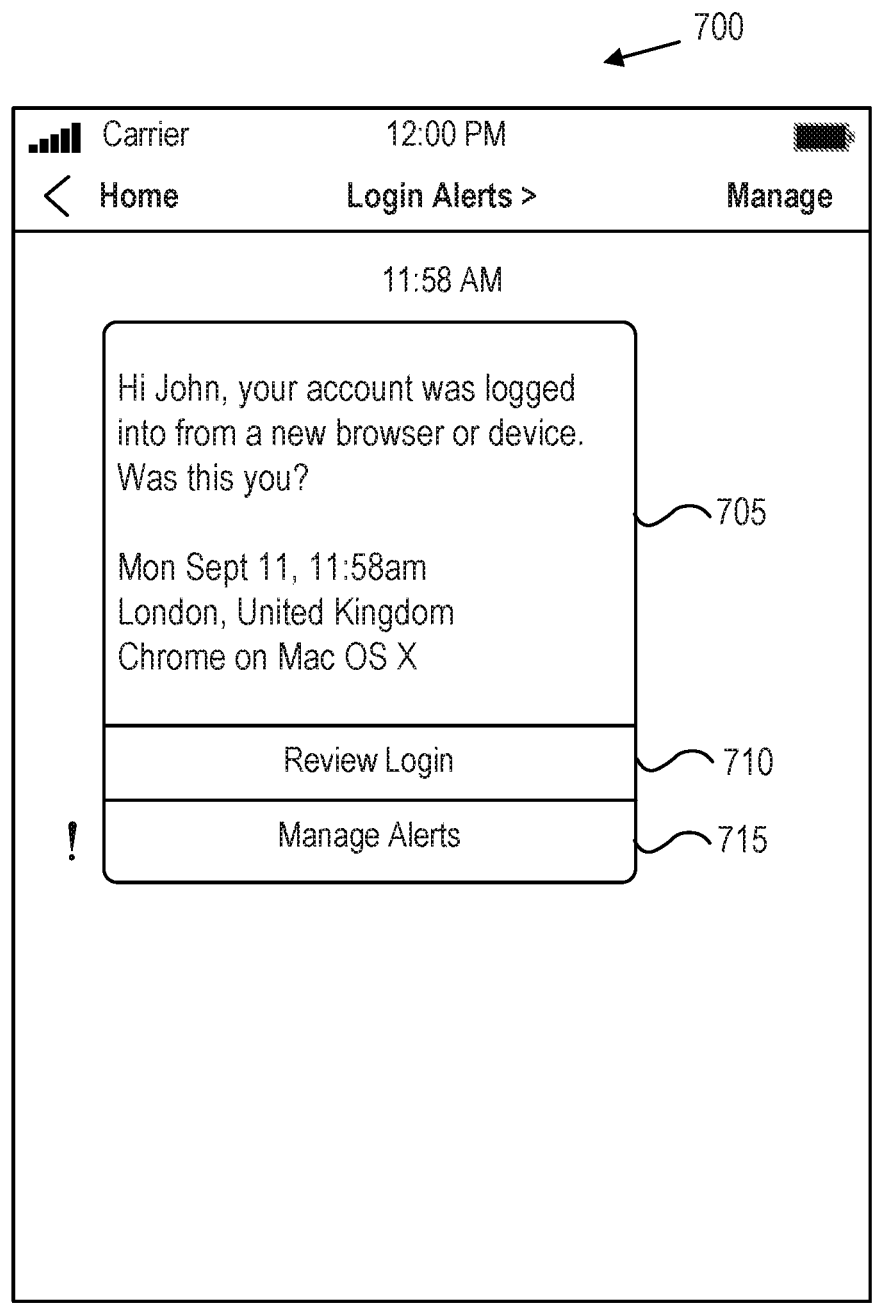
FIG. 7 is an exemplary user interface illustrating another login notification transmitted via the secondary platform.

FIG. 7 includes exemplary user interface 700 illustrating login notification 705 transmitted via the secondary platform and user interface elements to trigger an action by login alert module 129. User interaction with UI element 710 enables the user to review the unrecognized login. User interaction with UI element 715 enables the user to manage login notifications. In one embodiment, these UI elements trigger a pop-up window to allow user access to security features of the primary platform of communication system 130 while remaining in and utilizing the login credentials of the secondary platform on a trusted user device.

Figure 8:
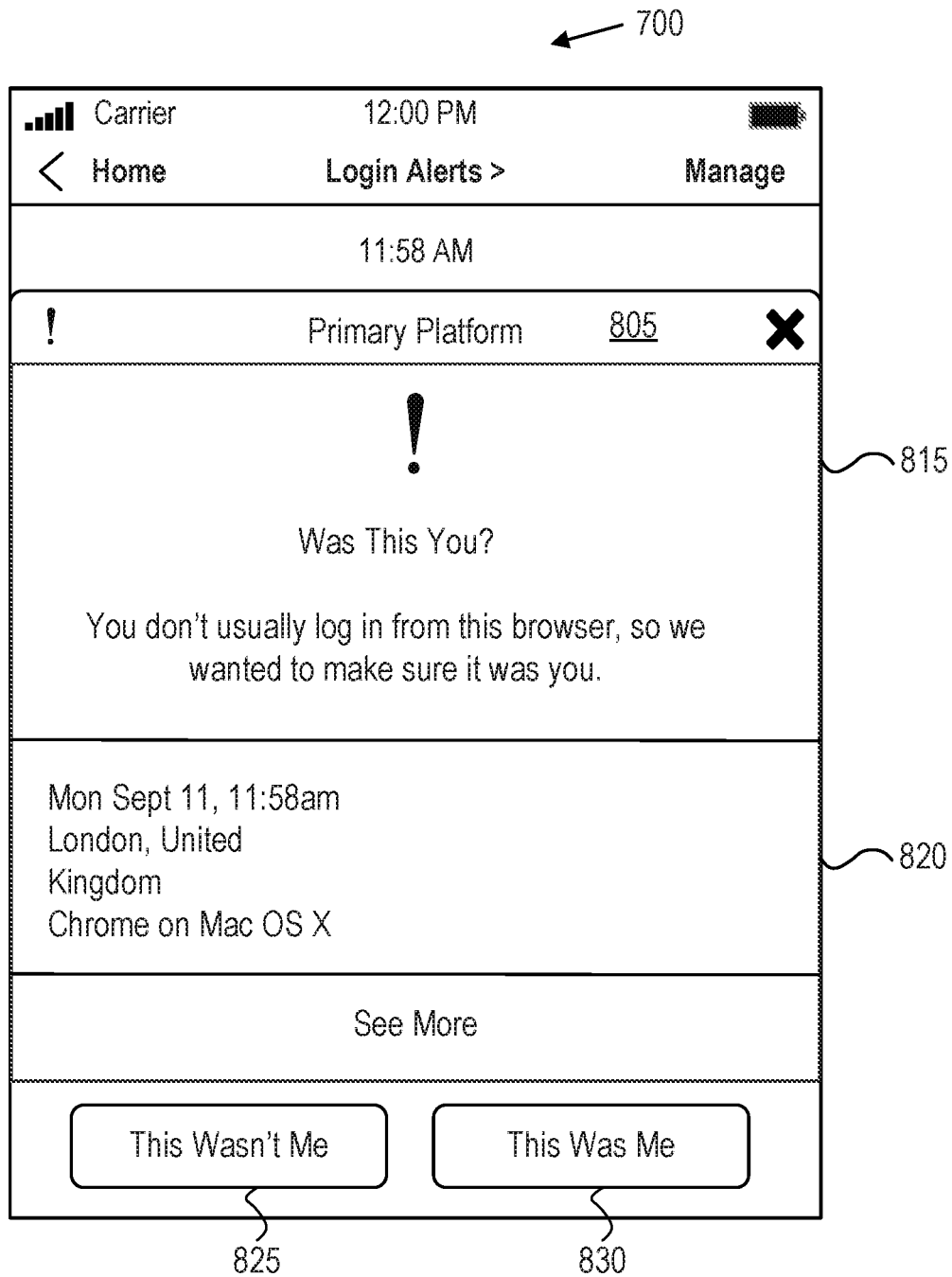
FIG. 8 is an exemplary user interface illustrating a primary platform pop-up window within the secondary platform application providing access to the login notification and corresponding actions.

FIG. 8 includes exemplary user interface 700 illustrating primary platform pop-up window 805 within the secondary platform application. For example, login alert module 129 may present window 805 to the user in response to user interaction with UI element 710. Window 805 provides user access to the login notification and corresponding actions. For example, description 815 summarizes the purpose of the notification and details 820 provide data about the unrecognized login. Details 820 may indicate, e.g., as described above, a time of the unrecognized login, a location of the unrecognized login, an application used in the unrecognized login, a description of the device used in the unrecognized login, graphical representation of the device or location, etc. Details 820 allow a user to determine if the user should confirm the unrecognized login as legitimate or take additional security measures. Based upon this user determination, the user can interact with UI element 825 to take additional security measures or with UI element 830 to confirm the login.

Figure 9:
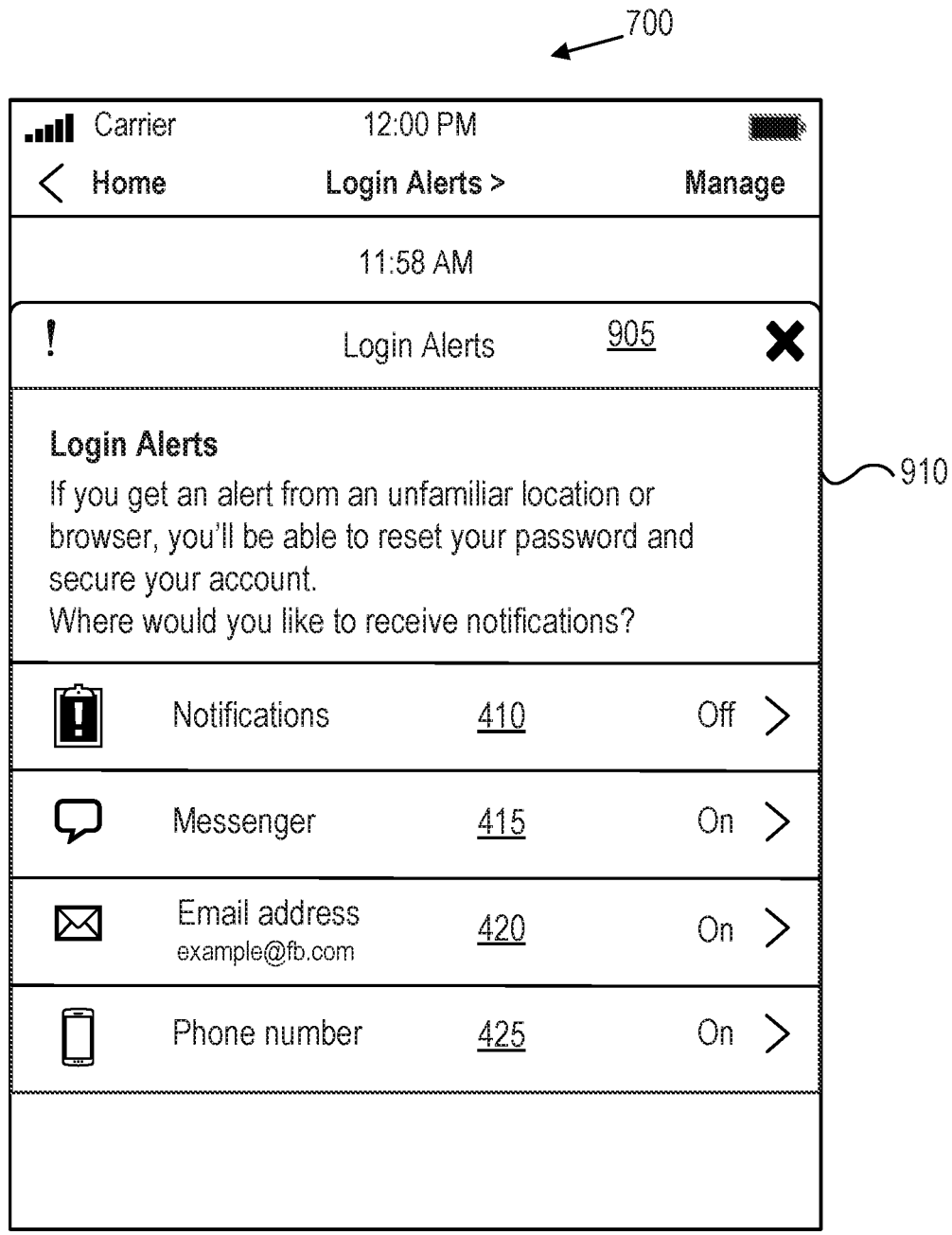
FIG. 9 is an exemplary user interface illustrating a primary platform pop-up window within the secondary platform application providing access to the login notification settings.

FIG. 9 includes exemplary user interface 700 illustrating primary platform pop-up window 905 within the secondary platform application providing access to the login notification settings. For example, login alert module 129 may present window 905 to the user in response to user interaction with UI element 715. Window 905 includes description 910 and settings similar to those described with reference to FIG. 4. The user can interact with window 905 to manage primary platform login notifications while remaining in and utilizing the login credentials of the secondary platform It will be apparent from this description that aspects of the inventions may be embodied, at least in part, in software. That is, computer-implemented method 300 may be carried out in a computer system or other data processing system (e.g., communication system 130) in response to its microprocessor executing sequences of instructions contained in a memory, such as memory 101 or other non-transitory machine-readable storage medium. In various embodiments, hardwired circuitry may be used in combination with the software instructions to implement the present embodiments. Thus, the techniques are not limited to any specific combination of hardware circuitry and software, or to any particular source for the instructions executed by communication system 130.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   accessing a request received from an application on a user device to log into a social networking platform using a user account that grants access to both (1) the social networking platform and (2) a messaging platform, wherein the social networking platform and the messaging platform are different platforms provided by a same social networking system;
   detecting the request as an unrecognized login attempt;
   in response to detecting the request as an unrecognized login attempt:
      determining settings of the user account include enabled push notifications via the messaging platform; and
      using a bot application on the messaging platform to provide a notification for display to a user of the user account via the messaging platform;
   after providing the notification for display, determining (1) that the user device has not communicated with the messaging platform within a threshold period of the notification and (2) a low probability that the notification has been delivered to the user based on the user device not having communicated with the messaging platform within the threshold period; and
   in response to determining the low probability, providing a notification for display via an additional communication channel and processing a response to the notification to grant or deny the request to login to the social networking platform using the user account.

2. The computer-implemented method of claim 1, wherein: the
   social networking platform enables at least one of (1) maintaining and viewing user profiles, (2) maintaining and viewing media collections, (3) joining groups, (4) following entities, or (5) organizing planned events; and
   the messaging platform enables sending digital messages between users of the messaging platform.

3. The computer-implemented method of claim 1, wherein the additional communication channel comprises an email.

4. The computer-implemented method of claim 1, wherein the additional communication channel comprises a text message.

5. The computer-implemented method of claim 1, wherein the notification includes a graphical user interface (GUI) element.

6. The computer-implemented method of claim 5, wherein the GUI element comprises a display of options to secure the user account.

7. The computer-implemented method of claim 5, wherein text of the notification varies based upon a context of the request.

8. A non-transitory computer-readable medium storing instructions, which when executed by a processing device, cause the processing device to perform a method comprising:
   accessing a request received from an application on a user device to log into a social networking platform using a user account that grants access to both (1) the social networking platform and (2) a messaging platform, wherein the social networking platform and the messaging platform are different platforms provided by a same social networking system;
   detecting the request as an unrecognized login attempt;
   in response to detecting the request as an unrecognized login attempt:
      determining settings of the user account include enabled push notifications via the messaging platform; and
      using a bot application on the messaging platform to provide a notification for display to a user of the user account via the messaging platform;
   after providing the notification for display, determining (1) that the user device has not communicated with the messaging platform within a threshold period of the notification and (2) a low probability that the notification has been delivered to the user based on the user device not having communicated with the messaging platform within the threshold period; and
   in response to determining the low probability, providing a notification for display via an additional communication channel and processing a response to the notification to grant or deny the request to login to the social networking platform using the user account.

9. The non-transitory computer-readable medium of claim 8, wherein:
   the social networking platform enables at least one of (1) maintaining and viewing user profiles, (2) maintaining and viewing media collections, (3) joining groups, (4) following entities, or (5) organizing planned events; and
   the messaging platform enables sending digital messages between users of the messaging platform.

10. The non-transitory computer-readable medium of claim 8, wherein the additional communication channel comprises an email.

11. The non-transitory computer-readable medium of claim 8, wherein the additional communication channel comprises a text message.

12. The non-transitory computer-readable medium of claim 8, wherein the notification includes a graphical user interface (GUI) element.

13. The non-transitory computer-readable medium of claim 12, wherein the GUI element comprises a display of options to secure the user account.

14. The non-transitory computer-readable medium of claim 12, wherein text of the notification varies based upon a context of the request.

15. An apparatus comprising:
    a processing device; and
    a memory coupled to the processing device, the memory storing instructions which, when executed by the processing device, cause the apparatus to:

access a request received from an application on a user device to log into a social networking platform using a user account that grants access to both (1) the social networking platform and (2) a messaging platform, wherein the social networking platform and the messaging platform are different platforms provided by a same social networking system;

detect the request as an unrecognized login attempt;

in response to detecting the request as an unrecognized login attempt:
  determine settings of the user account include enabled push notifications
via the messaging platform; and
  use a bot application on the messaging platform to provide a notification for display to a user of the user account via the messaging platform;

after providing the notification for display, determine (1) that the user device has not communicated with the messaging platform within a threshold period of the notification and (2) a low probability that the notification has been delivered to the user based on the user device not having communicated with the messaging platform within the threshold period; and in response to determining the low probability, provide a notification for display via an additional communication channel and process a response to the notification to grant or deny the request to login to the social networking platform using the user account.

16. The apparatus of claim 15, wherein:
the social networking platform enables at least one of (1) maintaining and viewing user profiles, (2) maintaining and viewing media collections, (3) joining groups, (4) following entities, or (5) organizing planned events; and
the messaging platform enables sending digital messages between users of the messaging platform.

17. The apparatus of claim 15, wherein the additional communication channel comprises an email.

18. The apparatus of claim 15, wherein the additional communication channel comprises a text message.

19. The apparatus of claim 15, wherein the notification includes a graphical user interface (GUI) element.

20. The apparatus of claim 19, wherein the GUI element comprises a display of options to secure the user account.

* * * * *